H. C. SEIPP.
TIRE.
APPLICATION FILED JAN. 2, 1913.
1,133,066.
Patented Mar. 23, 1915.
3 SHEETS—SHEET 1.
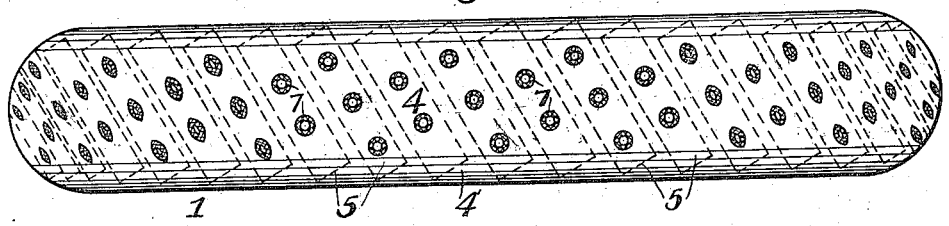
Fig. 1.
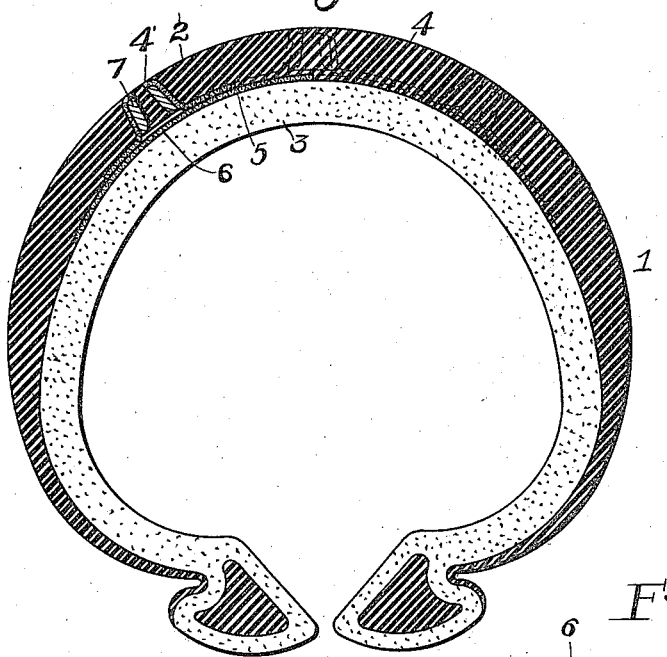
Fig. 2.
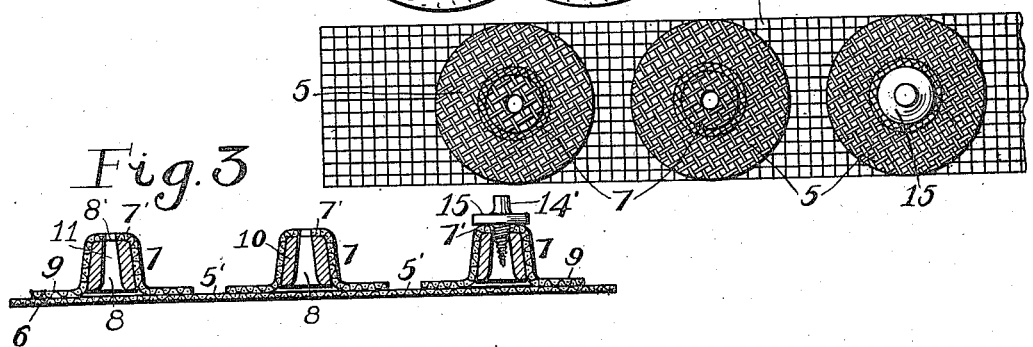
Fig. 4.
Fig. 3.
Fig. 5.
Witnesses
Inventor
Henry C. Seipp,
By J. M. Cooke,
Attorney.

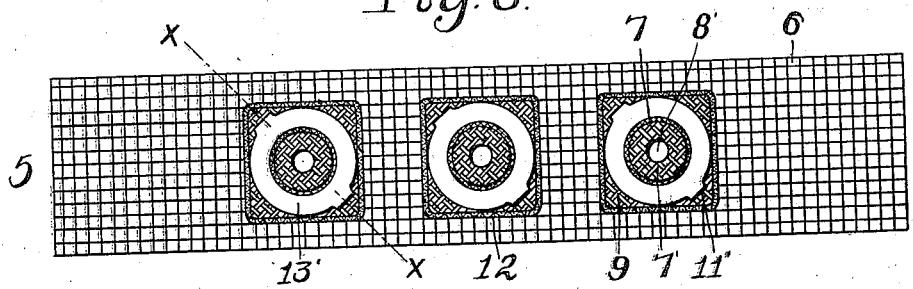
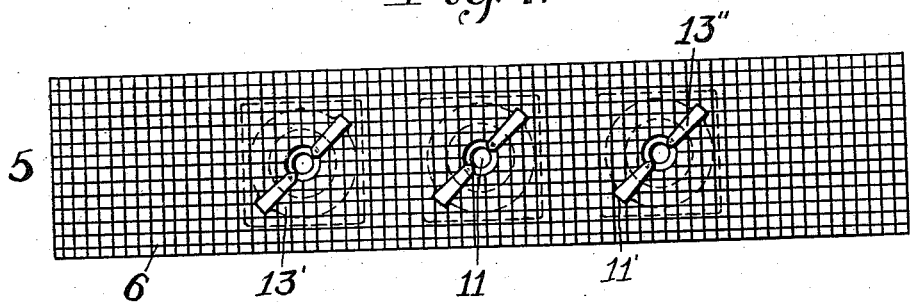
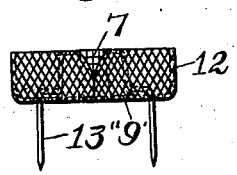
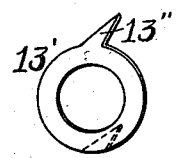
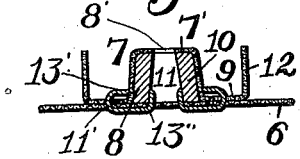

H. C. SEIPP.
TIRE.
APPLICATION FILED JAN. 2, 1913.

1,133,066.

Patented Mar. 23, 1915.
3 SHEETS—SHEET 3.

Witnesses:
J. W. Mayfield
T. B. Humphries

Inventor:
Henry C. Seipp.
By J. N. Cooke
attorney.

UNITED STATES PATENT OFFICE.

HENRY C. SEIPP, OF PITTSBURGH, PENNSYLVANIA.

TIRE.

1,133,066.  Specification of Letters Patent.  Patented Mar. 23, 1915.

Application filed January 2, 1913. Serial No. 739,686.

*To all whom it may concern:*

Be it known that I, HENRY C. SEIPP, a resident of Pittsburgh, in the county of Allegheny and State of Pennsylvania, have invented a new and useful Improvement in Tires; and I do hereby declare the following to be a full, clear, and exact description thereof.

My invention relates to tires and has special reference to resilient tires, such as are used on automobiles, auto trucks and other vehicles.

The object of my invention is to form a tire tread device which will be cheap, simple and efficient in its construction, and one which when in use on a tire will enable such tire to be non-slipping or non-skidding, will reduce the wear on such tire to a minimum and will make the same puncture proof.

To these ends my invention consists, generally stated, in the novel arrangement, construction and combination of parts as hereinafter more specifically set forth and described and particularly pointed out in the claims.

To enable others skilled in the art to which my invention appertains to construct and use my improved tire I will describe the same more fully, referring to the accompanying drawings, in which—

Figure 11:
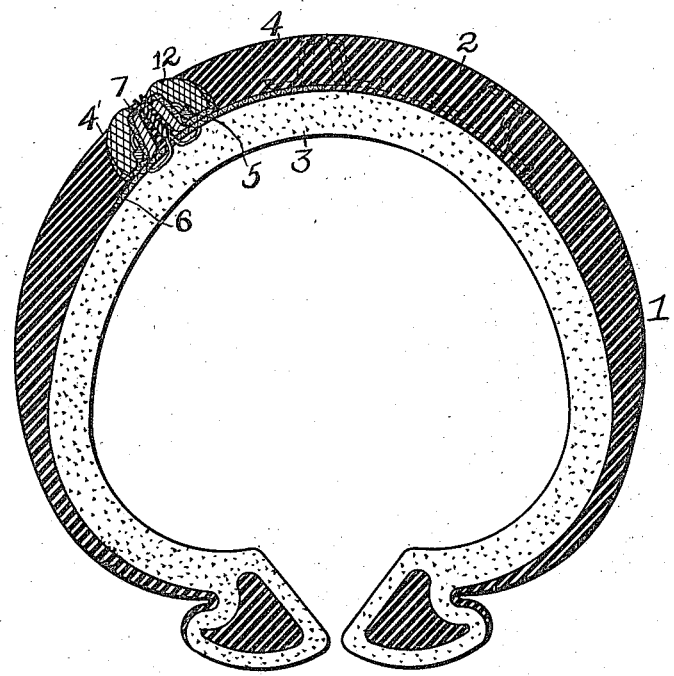
Figure 12:
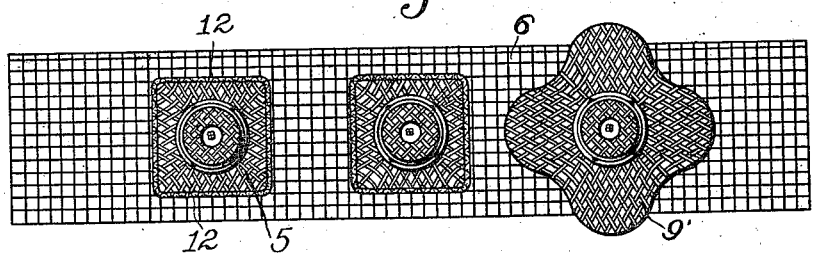
Figure 13:
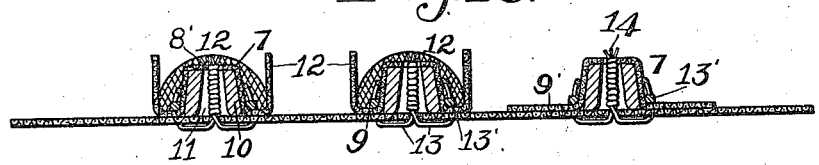

Figure 1 shows a plan view of the tread of a tire embodying my invention. Fig. 2 is an enlarged cross sectional view of such tire. Fig. 3 is a sectional view of one of the tread devices. Fig. 4 is a plan view of the same. Fig. 5 is a side elevation of one of the plugs employed. Fig. 6 is a top plan view of another form of the device. Fig. 7 is a bottom plan view of the same. Fig. 8 is a side elevation of one of the projections shown in Fig. 6, with upturned flanges. Fig. 9 is a perspective view of the binding clamp employed in Fig. 6. Fig. 10 is a cross section view on the line *x—x* Fig. 6. Fig. 11 is a cross section of a tire showing another form of my improved tread device. Fig. 12 is a sectional view of one of the devices shown in Fig. 6. Fig. 13 is a plan view of the same.

Like symbols of reference herein indicate like parts in each of the figures of the drawing.

As illustrated in the drawing 1 represents one of the usual approved forms of resilient tires for use with the ordinary pneumatic tube (not shown) within the same, which tire as generally formed is provided with the outer or exterior surface 2 of resilient material, such as rubber, and the inner or interior surface 3 of textile material, within the same.

Extending around the tread 4 of the tire 1 and within such tire are a series of tread devices 5, which are adapted to be molded or inserted in the tire in any suitable manner and preferably within the outer surface 2 and resting on the inner surface 3. The devices 5 are formed of a flexible plate, sheet or strip 6, of perforated metal, such as wire cloth, and they each extend across the tread 4 of the tire, preferably at an angle, and parallel with and spaced from each other. Extending out from each of the strips 6 is a series of tits or projections 7 of an inverted cup-shaped form which are suitably formed thereon and so positioned that they pass through the material composing the outer surface 2 of the tire 1 in order to allow the outer faces or ends of the same to be substantially flush with the periphery 4' of the tread 4, so that such strips will form the base 5' of the devices. As shown, the projections 7 are formed from perforated metal, such as wire cloth, and shaped in any suitable manner, so that they are circular in cross section and hollow to form a receptacle 8 within each of the same for the purpose hereinafter described. The projections 7 are also preferably tapered inwardly toward their outer ends, and such ends bent inwardly so that a flange 7' with a central opening or hole 8' in the same is formed thereby, while a flange base 9 is formed on such projections at their inner ends for attaching or securing such projections to the strips 6 in any suitable manner, such as by soldering, welding, lacing, etc.

After the formation of the projections 7 in the manner above described and before they are attached or secured to the strips 6 a ferrule or block 10 of suitable frictional material, such as lead, is placed in each of the receptacles 8 of said projections and such block is provided with a hole 11 through the same, which is preferably widened at its base, while its outer end registers with the hole 8' in the flanged outer end 7' on the projections 7, so that when said projections are attached to said strips each of such blocks will be held in its projection by such flanged outer end and the portion of said strip under the same, and thus the devices 5 are completed and ready for being placed or assembled within the tire 1, as hereinbefore described.

When the devices 5 are thus assembled in the tire 1, the material composing the outer surface 2 of such tire will enter the interstices of the strips 6 and projections 7, as formed by the perforations or meshes in the same, as well as in the holes 11 in the blocks 10, so that the devices will be firmly embedded in the tire, and thereby provide a tire with a safety tread, which can be easily, cheaply and quickly manufactured and assembled, will add little, if any, weight to the tire as it will be light, strong and durable and can be formed of standard or stock material. The treading devices will not interfere in any way with the use and operation of the tire and will always give sufficient resiliency to the same at all times when in use on the tire, while at the same time the tire will be puncture proof and the device will add little if any to the cost in manufacturing the tire. It will also be seen that the wear on the tire will be greatly reduced by the use of the treading devices and loss of life or injury to persons, property or on vehicles on which it is used will be reduced to a minimum, whereas the construction of the tread devices will allow the material of the tire to permeate or penetrate the devices and thus amalgamate the whole into a single structure.

In forming the projections 7, the base flange 9 can assume the shape shown in Fig. 8 by having an undulating outer edge, as at 9', and such edge can be turned up or bent out to form a four sided wall by a series of flanges 12 around the projections 7, so that the material comprising the tread 4 can also enter between said flanges and said projections, as well as through and around said flanges 12. In this case the portion forming the projections 7 and flanges 12 can be attached to the strips 6 by means of two lacing wires 13 extending around each of the projections 7, through the base flange 9 of the same and up through the holes 8' and 11 in the projections 7 and blocks 10, so that the ends of said wires can be twisted about each other and passed through the projections 7 to form projections or extensions 14 for extending beyond the periphery 4' of the tread 4. A metallic ring 13' may be placed around the base of the projections 7 for supporting said projections in position by acting as a clamp or binder for the same, and as shown in Figs. 6, 7, 8, 9 and 10, such ring can also act as a means for securing such projections to the strips 6 by having prongs 13'' thereon, so that they can be passed through the base flange 9 of said projections and through the strip and then the ends of such prongs can be bent into the hole 11 in the blocks 10 through an opening 11' in said strip registering with said hole. In this case the lacing wires 13 will be dispensed with, while if desired the tire 1 can be further provided with other devices for extending or projecting beyond the periphery 4' of the tire tread 4 and which can be connected to the tread devices 5 to further assist the latter in forming a non-slipping or non-skidding tire, such as the projections or extensions 14'. These extensions 14' consist of a plug 15 having a threaded extension 15' for being screwed into the blocks 10 and the material therein through the holes 8' in the projections 7 and 11 in said blocks and such plug is provided with a flange portion 15'' on the same for fitting against the flange end 7' on said projections to hold said plug in position and prevent its further entrance into the block under pressure.

Various other modifications and changes in the design, arrangement, construction and application of my improved tread device may be resorted to without departing from the spirit of the invention or sacrificing any of its advantages.

What I claim as my invention and desire to secure by Letters-Patent is:—

1. A tire of resilient material comprising strips for insertion within the tire, said strips being provided with projections secured thereon extending outward to form receptacles for the insertion of a non-slipping material, a flange on the outer end of said projections for securing said non-slipping material in said receptacle, and wings extending outward from said projections to the periphery of the tire.

2. A tire of resilient material comprising strips for insertion within the tire, said strips being provided with projections thereon secured by means of a flange on said projections and extending outward to form receptacles for the insertion of a non-slipping material, wings extending outward from said flange to the periphery of the tire, and a flange on the outer end of said projection for securing said non-slipping material in said receptacle.

3. A tread for tires of resilient material comprising strips for insertion within the tire and provided with projections of perforated metal extending out therefrom to form receptacles for a non-slipping material, a clamp around said projections, and means on said clamp for securing said projections to said strips.

4. A tread for tires of resilient material comprising strips for insertion within the tire and provided with projections of perforated metal extending out therefrom to form receptacles for a non-slipping material, a clamp around said projections, and prongs on said clamp adapted to secure said projections to their connecting strip.

5. A tread device for tires of resilient material comprising strips for insertion within the tire and provided with projections of perforated metal extending out therefrom to form receptacles for a non-slipping material, a base flange extending out from and around said projections, a clamp around said projections, and prongs on said clamp adapted to be passed through said flange and strip and bent against said strip to secure said projections to said strip.

6. A tread device for tires of resilient material comprising strips for insertion within the tire and provided with projections of perforated metal extending out therefrom to form receptacles, a block of non-slipping material within said receptacles and having an opening in the same, a base flange extending out from said projections, a clamp around said projections, and prongs on said clamp adapted to be passed through said flange and strip and into said opening to secure said projections to said strip.

In testimony whereof, I the said HENRY C. SEIPP have hereunto set my hand.

HENRY C. SEIPP.

Witnesses:
T. B. HUMPHRIES,
J. N. COOKE.